United States Patent
Lee et al.

(10) Patent No.: US 12,525,604 B2
(45) Date of Patent: *Jan. 13, 2026

(54) NEGATIVE ELECTRODE ACTIVE MATERIAL FOR LITHIUM SECONDARY BATTERY AND LITHIUM SECONDARY BATTERY COMPRISING THE SAME

(71) Applicant: LG ENERGY SOLUTION, LTD., Seoul (KR)

(72) Inventors: Su Min Lee, Daejeon (KR); Yong Ju Lee, Daejeon (KR); Eun Kyung Kim, Daejeon (KR); Rae Hwan Jo, Daejeon (KR); Dong Hyuk Kim, Daejeon (KR); Se Mi Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/348,723

(22) Filed: Jul. 7, 2023

(65) Prior Publication Data

US 2023/0369567 A1    Nov. 16, 2023

Related U.S. Application Data

(63) Continuation of application No. 16/756,365, filed as application No. PCT/KR2018/012853 on Oct. 26, 2018, now Pat. No. 12,034,148.

(30) Foreign Application Priority Data

Oct. 27, 2017    (KR) .................. 10-2017-0140766

(51) Int. Cl.
| | |
|---|---|
| H01M 4/36 | (2006.01) |
| H01M 4/02 | (2006.01) |
| H01M 4/38 | (2006.01) |
| H01M 4/48 | (2010.01) |
| H01M 4/587 | (2010.01) |
| H01M 10/0525 | (2010.01) |

(52) U.S. Cl.
CPC .......... *H01M 4/364* (2013.01); *H01M 4/386* (2013.01); *H01M 4/483* (2013.01); *H01M 4/587* (2013.01); *H01M 10/0525* (2013.01); H01M 2004/021 (2013.01); H01M 2004/027 (2013.01)

(58) Field of Classification Search
CPC ...... H01M 4/364; H01M 4/386; H01M 4/483; H01M 4/587; H01M 10/0525; H01M 2004/021; H01M 2004/027; H01M 4/133; H01M 4/134; H01M 4/36; Y02E 60/10
See application file for complete search history.

(56) References Cited

U.S. PATENT DOCUMENTS

| | | | |
|---|---|---|---|
| 5,616,436 A | 4/1997 | Sonobe et al. | |
| 6,287,729 B1 | 9/2001 | Tamaki et al. | |
| 2003/0118908 A1 | 6/2003 | Ishikawa et al. | |
| 2004/0023115 A1 | 2/2004 | Kato et al. | |
| 2009/0181304 A1 | 7/2009 | Miyamoto et al. | |
| 2012/0052393 A1 | 3/2012 | Kameda et al. | |
| 2014/0349180 A1 | 11/2014 | Kim et al. | |
| 2015/0340687 A1 | 11/2015 | Put et al. | |
| 2016/0181612 A1 | 6/2016 | Lee et al. | |
| 2016/0185600 A1 | 6/2016 | Sotowa et al. | |
| 2016/0197342 A1 | 7/2016 | Lee et al. | |
| 2016/0233501 A1 | 8/2016 | Lee et al. | |
| 2017/0062822 A1* | 3/2017 | Hwang ............. | H01M 4/364 |
| 2017/0110729 A1 | 4/2017 | Tsuchiya et al. | |
| 2017/0187064 A1* | 6/2017 | Takeda ............. | H01M 4/364 |
| 2017/0309892 A1 | 10/2017 | Koike et al. | |
| 2018/0342755 A1* | 11/2018 | Yoon ............... | H01M 4/587 |
| 2019/0058192 A1 | 2/2019 | Tsuchiya et al. | |
| 2019/0062162 A1 | 2/2019 | Sotowa et al. | |
| 2019/0165373 A1 | 5/2019 | Lee et al. | |

FOREIGN PATENT DOCUMENTS

| | | |
|---|---|---|
| BR | 112015014930-8 A2 | 7/2017 |
| CN | 101171710 A | 4/2008 |
| CN | 102362381 A | 2/2012 |
| EP | 2 879 216 A1 | 6/2015 |
| JP | 2013-200984 A | 10/2013 |
| JP | 2014-146514 A | 8/2014 |
| JP | 2014-241302 A | 12/2014 |
| JP | 2015-164127 A | 9/2015 |
| JP | 2017-4727 A | 1/2017 |
| KR | 10-2004-0012541 A | 2/2004 |
| KR | 10-2015-0032014 A | 3/2015 |

(Continued)

OTHER PUBLICATIONS

European Notice of Opposition for corresponding European Application No. 18869600.9, dated Sep. 7, 2022.
Extended European Search Report for European Application No. 18869600.9, dated Oct. 12, 2020.
International Search Report issued in PCT/KR2018/012853 (PCT/ISA/210), dated Apr. 10, 2019.

*Primary Examiner* — Matthew T Martin
*Assistant Examiner* — Grace Ann Kenlaw
(74) *Attorney, Agent, or Firm* — Birch, Stewart, Kolasch & Birch, LLP

(57)    ABSTRACT

A negative electrode active material for a lithium secondary battery, the negative electrode active material including, based on 100 parts by weight of the total negative electrode active material, 5 parts by weight to 20 parts by weight of a first carbon-based particle, 55 parts by weight to 90 parts by weight of a second carbon-based particle, and 1 part by weight to 40 parts by weight of a silicon-based particle, wherein the specific surface area of the first carbon-based particle is 1.5 m²/g to 4.5 m²/g, the specific surface area of the second carbon-based particle is 0.4 m²/g to 1.5 m²/g, and the specific surface area of the first carbon-based particle is greater than the specific surface area of the second carbon-based particle, and capable of solving the problem of lifespan deterioration which may be caused by the use of a silicon-based particle as a negative electrode active material.

14 Claims, No Drawings

(56) References Cited

FOREIGN PATENT DOCUMENTS

| | | |
|---|---|---|
| KR | 10-2015-0032015 A | 3/2015 |
| KR | 10-2015-0073107 A | 6/2015 |
| KR | 10-2016-0023845 A | 3/2016 |
| KR | 10-2016-0084600 A | 7/2016 |
| KR | 10-2016-0097677 A | 8/2016 |
| KR | 10-2016-0136320 A | 11/2016 |
| KR | 10-2016-0149862 A | 12/2016 |
| KR | 10-2017-0007140 A | 1/2017 |
| KR | 10-2017-0025136 A | 3/2017 |
| WO | WO 2016/067539 A1 | 5/2016 |

\* cited by examiner

NEGATIVE ELECTRODE ACTIVE MATERIAL FOR LITHIUM SECONDARY BATTERY AND LITHIUM SECONDARY BATTERY COMPRISING THE SAME

CROSS-REFERENCE TO RELATED APPLICATIONS

The present application is a Continuation of U.S. application Ser. No. 16/756,365, filed on Apr. 15, 2020, which is the National Phase under 35 U.S.C. § 371 of International Application No. PCT/KR2018/012853, filed on Oct. 26, 2018, which claims the benefit of the priority of Korean Patent Application No. 10-2017-0140766, filed on Oct. 27, 2017, which are hereby incorporated by reference in their entirety.

TECHNICAL FIELD

The present invention relates to a negative electrode active material for a lithium secondary battery and a lithium secondary battery comprising the same, and more specifically, to a negative electrode active material for a lithium secondary battery comprising two types of carbon-based particles and a silicon-based particle to solve the problem of lifespan deterioration which may be caused by the use of the silicon-based particle, and a lithium secondary battery comprising the same.

BACKGROUND ART

As technology development and demand for mobile devices have increased, the demand for secondary batteries as an energy source has been significantly increased. Among such secondary batteries, lithium secondary batteries having high energy density and operating potential, long cycle life, and low self-discharging rate have been commercialized and widely used.

A lithium secondary battery is generally composed of a positive electrode comprising a positive electrode active material, a negative electrode comprising a negative electrode active material, a separator, and an electrolyte, and is a secondary battery charged and discharged by the intercalation-deintercalation of lithium ions. A lithium secondary battery has advantages of high energy density, high electromotive force, and high capacity, and is thus applied in various fields.

As a positive electrode active material constituting a positive electrode of a lithium secondary battery, a metal oxide such as $LiCoO_2$, $LiMnO_2$, $LiMn_2O_4$, or $LiNiO_2$ is used, and as a negative electrode active material constituting a negative electrode of a lithium secondary battery, a carbon-based material such as metal lithium, graphite, or activated carbon, or a material such as a silicon oxide ($SiO_x$) is used. Among the negative electrode active materials, metal lithium has been mainly used in the beginning. However, as the charge and discharge cycle proceeds, lithium atoms are grown on the surface of metal lithium and damage a separator, thereby damaging a battery, so that a carbon-based material is mainly used, recently.

However, the carbon-based material has a theoretical capacity of only about 400 mAh/g, and thus has a disadvantage in that capacity is small.

Accordingly, a variety of studies have been conducted to replace the carbon-based material with silicon (Si) which has a high theoretical capacity (4,200 mAh/g) as a negative electrode active material. When lithium is intercalated into silicon, the reaction formula is as follows:

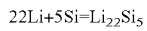 [Reaction Equation 1]

However, in most silicon negative electrode materials, the volume of silicon is expanded up to 300% due to intercalation of lithium, thereby destroying a negative electrode, so that there is a disadvantage in that high cycle characteristics are not exhibited. In addition, in the case of silicon, the volume thereof is expanded due to the intercalation of lithium as a cycle continues, and fading mechanism such as pulverization, contact losses with conducting agents and a current collector, and the unstable formation of a solid-electrolyte-interphase (SEI) may be exhibited.

In order to solve such a problem, a method for forming a carbon coating layer on the surface of a silicon-based particle has been developed. However, volume control is not facilitated even by the above method as the charge and discharge cycle of a battery continues, so that there is a problem in that efficiency is lowered. Korean Patent Laid-Open Publication No. 10-2016-0149862 discloses that a polymer complex is additionally disposed on a carbon coating layer to further control volume change.

However, even when a polymer complex is used, the control of volume change is not facilitated and the conductivity of an active material is deteriorated, so that there are problems in that resistance is increased and the capacity retention rate of a battery is deteriorated.

Therefore, there has been a demand for developing a negative active material capable of solving problems of lifespan deterioration and performance deterioration while using a silicon-based particles.

DISCLOSURE OF THE INVENTION

Technical Problem

An aspect of the present invention provides a negative electrode active material for a lithium secondary battery, the active material capable of solving the problem of lifespan deterioration due to the use of a silicon-based particle while having high energy density by comprising the silicon-based particle.

Another aspect of the present invention provides a negative electrode for a lithium secondary battery comprising the negative electrode active material for a lithium secondary battery, and a lithium secondary battery comprising the same.

Technical Solution

According to an aspect of the present invention, there is provided a negative electrode active material for a lithium secondary battery, the negative electrode active material comprising, 5 parts by weight to 20 parts by weight of a first carbon-based particle based on 100 parts by weight of a total negative electrode active material, 55 parts by weight to 90 parts by weight of a second carbon-based particle based on 100 parts by weight of a total negative electrode active material, and 1 part by weight to 40 parts by weight of a silicon-based particle based on 100 parts by weight of a total negative electrode active material, wherein the specific surface area of the first carbon-based particle is 1.5 m²/g to 4.5 m²/g, the specific surface area of the second carbon-based particle is 0.4 m²/g to 1.5 m²/g, and the specific surface area of the first carbon-based particle is greater than the specific surface area of the second carbon-based particle.

According to another aspect of the present invention, there are provided a negative electrode for a lithium secondary battery comprising the negative electrode active material for a lithium secondary battery, and a lithium secondary battery comprising the negative electrode for a lithium secondary battery.

Advantageous Effects

A negative electrode active material for a lithium secondary battery of the present invention comprises two types of carbon-based particles having different specific surface areas together with a silicon-based particle, and comprises two types of carbon-based particles having different specific surface areas and the silicon-based particle in a predetermined weight range, so that the problem of lifespan deterioration which may be caused by the use of a silicon-based particle as a negative electrode active material may be solved.

BEST MODE FOR CARRYING OUT THE INVENTION

Hereinafter, the present invention will be described in more detail to facilitate understanding of the present invention.

It will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A negative electrode active material for a lithium secondary battery of the present invention comprises a first carbon-based particle, a second carbon-based particle, and a silicon-based particle, and comprises 5 parts by weight to 20 parts by weight of the first carbon-based particle, 55 parts by weight to 90 parts by weight of the second carbon-based particle, and 1 part by weight to 40 parts by weight of the silicon-based particle, based on 100 parts by weight of the total negative electrode active material.

The specific surface area of the first carbon-based particle is 1.5 m$^2$/g to 4.5 m$^2$/g, the specific surface area of the second carbon-based particle is 0.4 m$^2$/g to 1.5 m$^2$/g, and the specific surface area of the first carbon-based particle is greater than the specific surface area of the second carbon-based particle. The negative electrode active material for a lithium secondary battery of the present invention satisfies the conditions that the first carbon-based particle and the second carbon-based particle have different specific surface areas, and the specific surface area of the first carbon-based particle is greater than the specific surface area of the second carbon-based particle. Therefore, when the specific surface area of the second carbon-based particle is 1.5 m$^2$/g, the specific surface area of the first carbon-based particle is greater than 1.5 m$^2$/g.

The negative electrode active material for a lithium secondary battery of the present invention comprises 5 parts by weight to 20 parts by weight of the first carbon-based particle, 55 parts by weight to 90 parts by weight of the second carbon-based particle, and 3 parts by weight to 20 parts by weight of the silicon-based particle, based on 100 parts by weight of the total negative electrode active material.

Also, the negative electrode active material for a lithium secondary battery according to one example of the present invention may comprise, specifically, 7 parts by weight to 15 parts by weight of the first carbon-based particle, 73 parts by weight to 88 parts by weight of the second carbon-based particle, and 5 parts by weight to 20 parts by weight of the silicon-based particle, based on 100 parts by weight of the total negative electrode active material. Also, the negative electrode active material for a lithium secondary battery according to one example of the present invention may comprise, more specifically, 9 parts by weight to 12 parts by weight of the first carbon-based particle, 81 parts by weight to 86 parts by weight of the second carbon-based particle, and parts by weight to 10 parts by weight of the silicon-based particle.

When the content of the first carbon-based particle is less than the above range, adhesion force of a negative electrode may be deteriorated. When the content of the second carbon-based particle is less than the above range, high-rate charge and discharge properties, cycle properties, and swelling properties may be deteriorated. When the content of the silicon-based particle is less than the above range, capacity properties may be deteriorated. Also, when the content of the first carbon-based particle is greater than the above range, high-rate charge and discharge properties may be deteriorated. When the content of the second carbon-based particle is greater than the above range, adhesion force of a negative electrode may be deteriorated. When the content of the silicon-based particle is greater than the above range, lifespan properties and swelling properties may be deteriorated.

The negative electrode active material for a lithium secondary battery of the present invention comprises two types of carbon-based particles having different specific surface areas together with a silicon-based particle in a predetermined weight range, and thus may exhibit effects of increasing battery capacity and improving high-charge rate properties and low-temperature properties due to the use of a silicon-based particle as a negative electrode active material, and may solve the problem of lifespan deterioration of a negative electrode and a secondary battery, which may be caused by large volume change of the silicon-based particle.

The negative electrode active material for a lithium secondary battery according to one example of the present invention may have a ratio of the total content of the first carbon-based particle and the second carbon-based particle to the content of the silicon-based particle in the range of 60:40 to 99:1, specifically 80:20 to 97:3, and more specifically 90:10 to 95:5.

Also, the negative electrode active material for a lithium secondary battery of the present invention comprises both a first carbon-based particle having a relatively large specific surface area and a second carbon-based particle having a relatively small specific surface area, so that the first carbon-based particle and the second carbon-based particle may counteract the influence of large volume change of the silicon-based particle. Also, the first carbon-based particle having a relatively large specific surface area may impart adhesion force to a negative electrode such that the negative electrode may exhibit appropriate adhesion force, and the second carbon-based particle having a relatively small specific surface area may allow the negative electrode active material to exhibit high initial efficiency, excellent high-rate charge and discharge properties, cycle properties, and swelling properties.

The first carbon-based particle may have a specific surface area of 1.5 m$^2$/g to 4.5 m$^2$/g, specifically greater than 1.5 m$^2$/g to less than 4.5 m$^2$/g, more specifically 2.5 m$^2$/g to 4 m²/g. When the first carbon-based particle has a specific surface area in the above range, adhesion force may be imparted to a negative electrode due to a specific surface area of a predetermined level or more, and the initial irreversible capacity may be prevented from being excessively increased during charge and discharge due to the specific surface area.

Also, the first carbon-based particle may have a tap density of 0.9 g/cc to 1.2 g/cc, specifically 0.95 g/cc to 1.15 g/cc, more specifically greater than 1.0 g/cc to 1.1 g/cc. When the first carbon-based particle has a tap density in the above range, the negative electrode active material may have appropriate negative electrode adhesion force and excellent energy density.

Also, the first carbon-based particle may have a c-axis direction crystal size of 90 nm to 120 nm, specifically 95 nm to 115 nm, more specifically 100 nm to 110 nm. When the crystal size of a carbon-based particle is small, the capacity of an active material is reduced due to low crystallinity. When the crystal size of the carbon-based particle is large, the length of lithium ions to be diffused after being intercalated between graphite layers of the carbon-based particle is long, so that the intercalation and deintercalation of the lithium ions may not be easily achieved, and thus diffusion resistance increases and lithium precipitation occurs during high-rate charge and discharge, thereby deteriorating lifespan properties. By having a crystal size in the above range, the first carbon-based particle may exhibit appropriate capacity and excellent output properties and life properties.

The first carbon-based particle may have an average particle diameter ($D_{50}$) of 8 μm to 16 μm, specifically 9 μm to 18 μm, more specifically 11 μm to 16 μm. When the average particle diameter ($D_{50}$) of the first carbon-based particle satisfies the above average, excellent output properties and life properties together with appropriate capacity properties may be exhibited. Meanwhile, when the average particle diameter (($D_{50}$) of the first carbon-based particle is less than the above range, the surface area in contact with electrolyte becomes relatively large, so that lifespan properties may be deteriorated due to an increase in a side reaction. When greater than the above range, the surface area in which the particle and the electrolyte in contact with each other becomes relatively small, so that the intercalation and deintercalation of lithium ions may not be easily achieved. Thus, diffusion resistance increases and lithium precipitation occurs during high-rate charge and discharge, so that lifespan properties are deteriorated.

The second carbon-based particle may have a specific surface area of 0.4 m²/g to 1.5 m²/g, specifically 0.4 m²/g to less than 1.5 m²/g, more specifically 0.6 m²/g to 1.1 m²/g. When the second carbon-based particle has a specific surface area in the above range, the initial irreversible capacity may be prevented from being excessively increased during charge and discharge.

Also, the second carbon-based particle may have a tap density of 0.7 g/cc to 1.0 g/cc, specifically 0.75 g/cc to 0.95 g/cc, more specifically 0.8 g/cc to less than 0.9 g/cc. When the second carbon-based particle has a tap density in the above range, the negative electrode active material may have excellent energy density.

Also, the second carbon-based particle may have a c-axis direction crystal size of 60 nm to 90 nm, specifically 65 nm to 85 nm, more specifically 70 nm to 80 nm. When the crystal size of a carbon-based particle is small, the capacity of an active material is reduced due to low crystallinity. When the crystal size of the carbon-based particle is large, the length of lithium ions to be diffused after being intercalated between graphite layers of the carbon-based particle is long, so that the intercalation and deintercalation of the lithium ions may not be easily achieved. Thus, diffusion resistance increases and lithium precipitation occurs during high-rate charge and discharge, so that lifespan properties are deteriorated. By having a crystal size in the above range, the second carbon-based particle may exhibit appropriate capacity and excellent output properties and life properties.

The second carbon-based particle may have an average particle diameter ($D_{50}$) of 15 μm to 25 μm, specifically 17 μm to 24 μm, more specifically 18 μm to 23 μm. When the average particle diameter ($D_{50}$) of the second carbon-based particle satisfies the above average, excellent output properties and life properties together with appropriate capacity properties may be exhibited. Meanwhile, when the average particle diameter ($D_{50}$) of the second carbon-based particle is less than the above range, the surface area in contact with electrolyte becomes relatively large, so that lifespan properties may be deteriorated due to an increase in a side reaction. When greater than the above range, the surface area in which the particle and the electrolyte in contact with each other becomes relatively small, so that the intercalation and deintercalation of lithium ions may not be easily achieved. Thus, diffusion resistance increases and lithium precipitation occurs during high-rate charge and discharge, so that lifespan properties are deteriorated.

The first carbon-based particle and the second carbon-based particle may be respectively, for example, one or more selected from the group consisting of natural graphite, kish graphite, pyrolytic carbon, mesophase pitch-based carbon fiber, meso-carbon microbeads, mesophase pitches, soft carbon, hard carbon, non-graphitizable carbon, graphitizable carbon, petroleum coke and coal-based coke.

Meanwhile, in one example of the present invention, the first carbon-based particle may be specifically natural graphite satisfying the specific surface area, tap density, crystal size and average particle diameter. Also, more specifically, the first carbon-based particle may be natural graphite having a sphericity of 0.9 or greater while satisfying the above conditions.

In the specification of the present invention, sphericity may be, when a particle is projected, a value obtained by dividing the circumference of a circle having the same area as a projected image by the circumferential length of the projected image, and may be specifically represented by Equation 1 below. The sphericity may be obtained from an SEM image, or alternatively, may be measured using a particle shape analyzer, for example, sysmex FPIA3000 manufactured by Malvern, and the like. The size of a crystal may also be determined through XRD analysis.

$$\text{Sphericity} = \text{circumference of a circle having the same area as a projected image of a particle}/\text{circumferential length of the projected image} \quad \text{[Equation 1]}$$

The natural graphite refers to naturally produced graphite, and examples thereof may comprise scaled graphite, scale graphite, or soil graphite. The natural graphite has advantages of being abundant, having a low price and high theoretical capacity and compaction density, and capable of implementing high output.

In the negative electrode active material for a lithium secondary battery according to one example of the present invention, as the first carbon-based particles, for example, natural graphite satisfying the sphericity may be selected and applied through a method of checking the shape of a particle through a SEM and confirming the same through a particle shape analyzer.

In one example of the present invention, the second carbon-based particle may be specifically artificial graphite satisfying the specific surface area, tap density, crystal size and average particle diameter. Also, more specifically, the second carbon-based particle may be artificial graphite having a sphericity of 0.9 or less while satisfying the above conditions.

In the negative electrode active material for a lithium secondary battery according to one example of the present invention, as the second carbon-based particles, for example, artificial graphite satisfying the sphericity may be selected and applied through a method of checking the shape of a particle through a SEM and confirming the same through a particle shape analyzer.

The silicon-based particle may be a mixture of one or more selected from the group consisting of Si, a silicon oxide particle ($SiO_x$, $0<x\leq2$), a Si-metal alloy, and a silicon-carbon complex, and may be specifically a silicon oxide particle ($SiO_x$, $0<x\leq2$). The silicon-based particle ($SiO_x$, $0<x\leq2$) may be a composite composed of crystalline $SiO_2$ and amorphous Si.

A metal of the Si-metal alloy may be an element selected from the group consisting of an alkali metal, an alkaline earth metal, a Group 13 element, a Group 14 element, a Group 15 element, a Group 16 element, a transition metal, a rare earth element and a combination thereof, but Si is excluded. Specific examples of the metal may comprise Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, and Os, Rh, Ir, Pd, Pt, Cu, Ag, Au, Zn, Cd, B, Al, Ga, Sn, In, Tl, Ge, P, Bi, S, Se, Te, Po, and a combination thereof.

The silicon-based particle may have an average particle diameter ($D_{50}$) of 1 μm to 30 μm, specifically 3 μm to μm, more specifically 4 μm to 10 μm. When the average particle diameter ($D_{50}$) of the silicon-based particle is too small, a side reaction with an electrolyte occurs on a large scale, so that lifespan performance may be deteriorated. When the average particle diameter ($D_{50}$) is too large, volume expansion occurs on a large scale during charge and discharge causing a crack in the particle, so that the lifespan performance may be deteriorated. Accordingly, when the silicon-based particle satisfies the above range, the side reaction with the electrolyte and the volume expansion of the silicone-based particle may be maintained to an appropriate degree, so that a battery comprising the same may exhibit excellent lifespan properties.

In the present invention, the specific surface area of the first carbon-based particle and the second carbon-based particle may be measured by the Brunauer-Emmett-Teller (BET) method. For example, using a porosimetry analyzer (Bell Japan Inc, Belsorp-II mini), the specific surface area may be measured by the BET 6-point method by the nitrogen gas adsorption/distribution method.

Also, the tap density may be obtained by filling the first carbon-based particle and the second carbon-based particle in a container and measuring the apparent density of the particle obtained by vibrating the particle under predetermined conditions.

Also, the c-axis direction crystal size represents Lc (002), which is the size of a crystallite in the c-axis direction when measured by XRD, and may be calculated by the Scherrer equation of Equation 2.

$$Lc = \frac{K\lambda}{\beta_{(2\theta)}\cos\beta}$$ [Equation 2]

K=Scherrer constant (K=0.9)
β=Half width
λ=Wavelength (0.154056 nm)
θ=Angle at maximum peak Also, the average particle diameter ($D_{50}$) may be defined as a particle diameter at 50% of a particle diameter distribution. The average particle diameter ($D_{50}$) is not particularly limited, but may be measured by a laser diffraction method or by using a SEM photograph. When using the laser diffraction method, it is possible to measure a particle diameter of from a submicron region to several millimeters, and thus it is possible to obtain results with high reproducibility and high degradability.

The negative electrode active material for a lithium secondary battery may be used in a negative electrode, and thus, the present invention provides a negative electrode for a lithium secondary battery comprising the negative electrode active material for a lithium secondary battery, and a lithium secondary battery comprising the same.

The lithium secondary battery may comprise a positive electrode, a negative electrode for the lithium secondary battery, and a separator interposed between the positive electrode and the negative electrode.

The positive electrode may be manufactured by a typical method known in the art. For example, a positive electrode may be manufactured by mixing and stirring a positive electrode active material with a solvent, if necessary, a binder, a conductive agent, and a dispersant, to prepare a slurry, and applying (coating) the slurry on a current collector of a metal material followed by pressing and drying.

The current collector of a metal material is a metal having high conductivity, and is not particularly limited as long as it is a metal to which the slurry of the positive electrode active material can be easily bonded and which has high conductivity without causing a chemical change in the battery. For example, stainless steel, aluminum, nickel, titanium, fired carbon, or aluminum or stainless steel that is surface-treated with one of carbon, nickel, titanium, silver, and the like may be used. In addition, microscopic irregularities may be formed on the surface of the current collector to improve the adhesion force of the positive electrode active material. The current collector may be used in various shapes such as that of a film, a sheet, a foil, a net, a porous body, a foam body, a non-woven fabric body, and the like, and may have a thickness of 3 μm to 500 μm.

The positive electrode active material may be, for example, a layered compound such as a lithium cobalt oxide ($LiCoO_2$), a lithium nickel oxide ($LiNiO_2$), $Li[Ni_x Co_y Mn_z M v]O_2$ (wherein M is any one or two or more elements selected from the group consisting of Al, Ga, and In; and $0.3\leq x\leq1.0$, $0\leq y$, $z\leq0.5$, $0\leq v\leq0.1$, $x+y+z+v=1$), and $Li(Li_a M_{b-a-b'}M'_{b'})O_{2-c}A_c$ (wherein $0\leq a\leq0.2$, $0.6\leq b\leq1$, $0\leq b'\leq0.2$; M comprises one or more selected from the group consisting of Mn, Ni, Co, Fe, Cr, V, Cu, Zn, and Ti; M' is one or more selected from the group consisting of Al, Mg, and B, and A is one or more selected from the group consisting of P, F, S, and N) or a compound substituted with one or more transition metals; a lithium manganese oxide represented by Formula $Li_{1+y}Mn_{2-y}O_4$ (wherein y is 0 to 0.33), $LiMnO_3$, $LiMn_2O_3$, and $LiMnO_2$; a lithium copper oxide ($Li_2CuO_2$); a vanadium oxide such as $LiV_3O_8$, $LiFe_3O_4$, and $Cu_2V_2O_7$; a Ni-site type lithium nickel oxide represented by Formula $LiN_{1-y}M_yO_2$ (wherein M is any one of Co, Mn, Al, Cu, Fe, Mg, B, or Ga and y is 0.01 to 0.3); a lithium manganese complex oxide represented by Formula $LiMn_{2-y}M_yO_2$ (wherein M is any one of Co, Ni, Fe, Cr, Zn, or Ta, and y is 0.01 to 0.1) or Formula $Li_2Mn_3MO_8$ (wherein M is any one of Fe, Co, Ni, Cu, or Zn); LiMn$_2$O$_4$ in which a part of Li in the formula is substituted with an alkaline earth metal ion; a disulfide compound; Fe$_2$(MoO$_4$)$_3$, and the like, but is not limited thereto.

Examples of the solvent for forming the positive electrode may comprise organic solvents such as N-methyl pyrrolidone (NMP), dimethyl formamide (DMF), acetone, and dimethyl acetamide, or water, and these solvents may be used alone or in combination of two or more thereof. The amount of the solvent to be used is sufficient if the solvent may dissolve and disperse the positive electrode active material, the binder, and the conductive agent in consideration of an applying thickness of a slurry and preparing yield.

Examples of the binder may comprise a polyvinylidene fluoride-hexafluoropropylene copolymer (PVDF-co-HFP), polyvinylidenefluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, and poly acrylic acid, or a polymer having the hydrogen thereof substituted with Li, Na, or Ca, and the like, or various kinds of binder polymers such as various copolymers thereof.

The conductive material is not particularly limited as long as it has conductivity without causing a chemical change in the battery. For example, graphite such as natural graphite or artificial graphite; a carbon-based material such as carbon black, acetylene black, Ketjen black, channel black, furnace black, lamp black, and thermal black; conductive fiber such as carbon fiber and metal fiber; a conductive tube such as a carbon nanotube; metal powder such as fluorocarbon powder, aluminum powder, and nickel powder; a conductive whisker such as zinc oxide and potassium titanate; a conductive metal oxide such as titanium oxide; a conductive material such as a polyphenylene derivative, and the like may be used. The conductive material may be used in an amount of 1 wt % to 20 wt % based on the total weight of the positive electrode slurry.

The dispersant may be an aqueous dispersant or an organic dispersant agent such as N-methyl-2-pyrrolidone.

The negative electrode may be manufactured by a typical method known in the art. For example, the negative electrode may be manufactured by mixing and stirring the negative electrode active material with additives such as a binder and a conductive agent to prepare a negative electrode slurry, and applying (coating) the slurry on a negative electrode current collector followed by drying and pressing.

Examples of the solvent for forming the negative electrode may comprise organic solvents such as N-methyl pyrrolidone (NMP), dimethyl formamide (DMF), acetone, and dimethyl acetamide, or water, and these solvents may be used alone or in combination of two or more thereof. The amount of the solvent to be used is sufficient if the solvent may dissolve and disperse the negative electrode active material, the binder, and the conductive agent in consideration of an applying thickness of a slurry and preparing yield.

The binder may be used to bind negative electrode active material particles to hold a molded body, and is not particularly limited as long as it is a binder typically used in manufacturing a slurry for a negative electrode active material. For example, non-aqueous binders such as polyvinyl alcohol, carboxymethyl cellulose, hydroxypropylene cellulose, diacetylene cellulose, polyvinyl chloride, polyvinylpyrrolidone, polytetrafluoroethylene (PTFE), polyvinylidene fluoride (PVdF), polyethylene or polypropylene may be used. Also, any one selected from the group consisting of acrylonitrile-butadiene rubber, styrene-butadiene rubber, and acrylic rubber, which are aqueous binders, or a mixture of two or more thereof may be used. An aqueous binder is economical and eco-friendly when compared with a non-aqueous binder, and also harmless to the health of an operator. Since an aqueous binder has excellent binding effect when compared with a non-aqueous binder, the ratio of the active material per unit volume may be increased, thereby enabling high capacity. Preferably, styrene-butadiene rubber may be used as an aqueous binder.

The binder may be included in an amount of 10 wt % or less based on the total weight of the slurry for a negative electrode active material, specifically in an amount of 0.1 wt % to 10 wt %. If the content of the binder is less than 0.1 wt %, the effect of using the binder is insignificant, and if greater than 10 wt %, it is not preferable since there is a concern that the capacity per volume may be deteriorated due to a relative decreased in the content of the active material with an increase in the content of the binder.

The conductive agent is not particularly limited as long as it has conductivity without causing a chemical change in the battery. Examples of the conductive agent may comprise graphite such as natural graphite or artificial graphite; a carbon-based material such as carbon black, acetylene black, Ketjen black, channel black, furnace black, lamp black, and thermal black; conductive fiber such as carbon fiber and metal fiber; a conductive tube such as a carbon nanotube; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like may be used. The conductive agent may be used in an amount of 1 wt % to 9 wt % based on the total weight of the slurry for a negative electrode active material.

A negative electrode current collector used in the negative electrode according to an embodiment of the present invention may have a thickness of 3 μm to 500 μm. The negative electrode current collector is not particularly limited as long as it has conductivity without causing a chemical change in the battery. For example, copper, gold, stainless steel, aluminum, nickel, titanium, fired carbon, copper or stainless steel that is surface-treated with one of carbon, nickel, titanium, silver, and the like, and an aluminum-cadmium alloy may be used. Also, microscopic irregularities may be formed on the surface of the negative electrode current collector to improve the adhesion of a negative electrode active material, and the negative electrode current collector may be used in various forms of such as a film, a sheet, a foil, a net, a porous body, a foam body, and a non-woven fabric body.

Also, as a separator, a typical porous polymer film used as a separator, for example, a porous polymer film prepared with a polyolefin-based polymer, such as an ethylene homopolymer, a propylene homopolymer, an ethylene/butene copolymer, an ethylene/hexene copolymer, and an ethylene/methacrylate copolymer may be used alone, or a laminated structure thereof may be used. Alternatively, a typical porous non-woven fabric, for example, a non-woven fabric formed of high melting point glass fibers or polyethylene terephthalate fibers may be used, but the embodiment of the present invention is not limited thereto.

A lithium salt which may be included as an electrolyte used in the present invention may be used without limitation as long as it is typically used as an electrolyte for a lithium secondary battery. For example, as negative electrode ion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

An organic solvent included in the electrolyte used in the present invention may be used without limitation as long as it is typically used in an electrolyte for a secondary battery. Representative examples thereof may be any one selected from the group consisting of propylene carbonate (PC), ethylene carbonate (EC), diethyl carbonate (DEC), dimethyl carbonate (DMC), ethyl methyl carbonate (EMC), methyl propyl carbonate, dipropyl carbonate, dimethyl sulfoxide, acetonitrile, dimethoxyethane, diethoxyethane vinylene carbonate, sulfolane, gamma-butyrolactone, propylene sulfite, and tetrahydrofuran, or a mixture of two or more thereof. Specifically, among the carbonate-based organic solvents, ethylene carbonate and propylene carbonate, which are cyclic carbonates, are organic solvents of high viscosity and have high dielectric constant so as to dissociate a lithium salt in an electrolyte well, and thus may be preferably used. When such a cyclic carbonate is mixed with a low viscosity, low dielectric constant linear carbonate such as dimethyl carbonate and diethyl carbonate in an appropriate ratio, an electrolyte having a high electrical conductivity may be prepared, and thus may be more preferably used. Specifically, a lithium secondary battery containing the negative electrode active material for a lithium secondary battery of the present invention contains graphite having a layer of alkali carbonate formed on the surface thereof, thereby having excellent propylene carbonate properties, and thus may preferably contain the propylene carbonate such that the lithium secondary battery may exhibit excellent low-temperature performance.

Optionally, the electrolyte stored in accordance with the present invention may further comprise an additive such as overcharge protection agent contained in a typical electrolyte.

The external shape of the lithium secondary battery of the present invention is not particularly limited, but may be a cylindrical shape using a can, a square shape, a pouch shape, a coin shape, or the like.

The lithium secondary battery according to the present invention may be used in a battery cell used as a power source of a small-sized device, and may be preferably used as a unit cell in a medium- and large-sized battery module comprising a plurality of battery cells, as well.

Preferable examples of the above medium- and large-sized devices comprise electric vehicles, hybrid electric vehicles, plug-in hybrid electric vehicles, and electric power storage systems, but are not limited thereto.

MODE FOR CARRYING OUT THE INVENTION

EXAMPLES

Hereinafter, the present invention will be described in more detail with reference to Examples and Experimental Examples. However, the present invention is not limited by these Examples and Experimental Examples. The embodiments according to the present invention can be modified into various different forms, and the scope of the present invention should not be construed as being limited to the embodiments described below. The embodiments of the present invention are provided to more fully describe the present invention to those skilled in the art.

Example 1

A negative electrode active material composed of 10 parts by weight of natural graphite having a specific surface area of 3.0 $m^2/g$, a tap density of 1.1 g/cc, a c-axis direction crystal size of 110 nm, an average particle diameter ($D_{50}$) of 16 μm, 85 parts by weight of artificial graphite having a specific surface area of 1.0 $m^2/g$, a tap density of 0.9 g/cc, a c-axis direction crystal size of 70 nm, an average particle diameter ($D_{50}$) of 23 μm, and 5 parts by weight of a silicon oxide particle ($SiO_x$, 0<x<2) having an average particle diameter ($D_{50}$) of 6 μm, super c65 (manufacturer) as a conductive agent, and polyvinylidene fluoride (PVdF) as a binder were mixed in N-methyl pyrrolidone (NMP) as a solvent in a weight ratio of 94:1:5 to prepare a uniform negative electrode slurry.

The prepared negative electrode slurry was coated with a thickness of 65 μm on one surface of a copper current collector, dried, roll pressed, and then punched to a predetermined size to manufacture a negative electrode.

<Manufacturing of Lithium Secondary Battery>

A Li metal was used as a counter electrode, and after a polyolefin separator was interposed between the negative electrode and the Li metal, an electrolyte in which 1 M of $LiPF_6$ was dissolved was injected into a solvent in which ethylene carbonate (EC), propylene carbonate (PC), and ethyl methyl carbonate (EMC) were mixed at a volume ratio of 20:10:70.

Example 2

A negative electrode and a lithium secondary battery were manufactured in the same manner as in Example 1 except that the natural graphite and the artificial graphite were used in an amount of 5 parts by weight and 90 parts by weight, respectively.

Example 3

A negative electrode and a lithium secondary battery were manufactured in the same manner as in Example 1 except that the natural graphite and the artificial graphite were used in an amount of 20 parts by weight and 75 parts by weight, respectively.

Example 4

A negative electrode and a lithium secondary battery were manufactured in the same manner as in Example 1 except that the natural graphite, the artificial graphite, and the silicon oxide particle were used in an amount of 10 parts by weight, 80 parts by weight, and 10 parts by weight, respectively.

Example 5

A negative electrode and a lithium secondary battery were manufactured in the same manner as in Example 1 except that natural graphite having a specific surface area of 2.0 $m^2/g$, a tap density of 1.2 g/cc, a c-axis direction crystal size of 120 nm, an average particle diameter ($D_{50}$) of 12 μm was used as the natural graphite, and that artificial graphite having a specific surface area of 0.6 $m^2/g$, a tap density of 0.85 g/cc, a c-axis direction crystal size of 60 nm, an average particle diameter ($D_{50}$) of 18 μm was used as the artificial graphite.

Comparative Example 1

A negative electrode and a lithium secondary battery were manufactured in the same manner as in Example 1 except that the natural graphite and the artificial graphite were used in an amount of 1 part by weight and 94 parts by weight, respectively.

Comparative Example 2

A negative electrode and a lithium secondary battery were manufactured in the same manner as in Example 1 except that the natural graphite and the artificial graphite were used in an amount of 25 parts by weight and 70 parts by weight, respectively.

Comparative Example 3

A negative electrode and a lithium secondary battery were manufactured in the same manner as in Example 1 except that the natural graphite, the artificial graphite, and the silicon oxide particle were used in an amount of 20 parts by weight, 78 parts by weight, and 2 parts by weight, respectively, and that the prepared negative electrode slurry was coated with a thickness of 72 μm on one surface of the copper current collector to match the capacity of the negative electrode of Example 1.

Comparative Example 4

A negative electrode and a lithium secondary battery were manufactured in the same manner as in Example 1 except that the natural graphite, the artificial graphite, and the silicon oxide particle were used in an amount of 4 parts by weight, 90 parts by weight, and 6 parts by weight, respectively.

Comparative Example 5

A negative electrode and a lithium secondary battery were manufactured in the same manner as in Example 1 except that the natural graphite, the artificial graphite, and the silicon oxide particle were used in an amount of 20 parts by weight, 70 parts by weight, and 10 parts by weight, respectively.

Comparative Example 6

A negative electrode and a lithium secondary battery were manufactured in the same manner as in Example 1 except that natural graphite having a specific surface area of 10 m²/g, a tap density of 1.1 g/cc, a c-axis direction crystal size of 110 nm, and an average particle diameter ($D_{50}$) of 16 μm was used instead of the natural graphite.

Comparative Example 7

A negative electrode and a lithium secondary battery were manufactured in the same manner as in Example 1 except that artificial graphite having a specific surface area of 2 m²/g, a tap density of 0.9 g/cc, a c-axis direction crystal size of 70 nm, and an average particle diameter ($D_{50}$) of 23 μm was used instead of the artificial graphite.

Experimental Example 1: Evaluation of Output Properties

The secondary batteries respectively manufactured in Examples 1 to 5 and Comparative Examples 1 to 6 were discharged at 25° C. with SOC (charge depth) of 50 to 5 C for 10 seconds to calculate output using a voltage difference generated. The results are shown in Table 1 below.

Experimental Example 2: Evaluation of Initial Efficiency and Cycle Properties

The batteries respectively manufactured in Examples 1 to 5 and Comparative Examples 1 to 6 were charged at 25° C. with a constant current (CC) of 0.8 C until 4.25 V was reached. Thereafter, the batteries were charged for the first time with a constant voltage (CV) until charge current reached 0.005 C (cut-off current). Thereafter, after being left for 20 minutes, the batteries were discharged with a constant current (CC) of 0.8 C until 2.5 V was reached. This was repeated in 1 to 50 cycles. The results are shown in Table 1 below.

Experimental Example 3: Evaluation of Electrode Adhesion Force

A double-sided tape of 2 cm×10 cm was attached on a slide glass, and the negative electrodes respectively manufactured in Examples 1 to 5 and Comparative Examples 1 to 6 were cut a size of 1 cm×10 cm and attached on the double-sided tape by applying a predetermined force using a 2 kg roller. The slide glass having the negative electrode attached thereto was laid out at an angle of 180°, and the attached negative electrode was peeled off at a rate of 20 m/min to measure force at this time. The above was repeated five times and the average value is shown in Table 1 below.

TABLE 1

| | Output performance (One-time basis, %, 25° C., SOC 50) | Capacity retention rate (@300 cycle) | Electrode adhesion force (g/cm) |
|---|---|---|---|
| Example 1 | 100 | 91 | 25 |
| Example 2 | 99 | 85 | 20 |
| Example 3 | 95 | 85 | 26 |
| Example 4 | 99 | 83 | 24 |
| Example 5 | 100 | 90 | 26 |
| Comparative Example 1 | 98 | 65 | 9 |
| Comparative Example 2 | 89 | 78 | 27 |
| Comparative Example 3 | 90 | 77 | 19 |
| Comparative Example 4 | 97 | 63 | 8 |
| Comparative Example 5 | 87 | 70 | 27 |
| Comparative Example 6 | 90 | 61 | 24 |
| Comparative Example 7 | 98 | 80 | 25 |

Referring to Table 1, it can be confirmed that the output performance, capacity retention rate after the 300th cycle, and electrode adhesion force of a secondary battery comprising the negative electrode active material of Examples 1 to 5 are all excellent.

Meanwhile, the secondary battery comprising the negative electrode active material of Comparative Example 1, which contains a relatively large amount of artificial graphite, had excellent output performance but had low electrode adhesion force, and thus had poor lifespan properties. The secondary battery comprising the negative electrode active material of Comparative Example 2, which contains a relatively large amount of natural graphite, had high electrode adhesion force and better lifespan properties when compared with the battery of Comparative Example 1, but had poor output performance.

Such tendency was also confirmed through Comparative Examples 4 and 5. That is, the secondary battery comprising the negative electrode active material of Comparative Example 4, which contains less amount of natural graphite than an appropriate amount thereof, had excellent output performance but had low electrode adhesion force, and thus had poor lifespan properties. The secondary battery comprising the negative electrode active material of Comparative Example 5, which contains relatively less amount of artificial graphite than an appropriate amount thereof, had high electrode adhesion force and better lifespan properties when compared with the battery of Comparative Example 4, but had poor output performance. Meanwhile, the secondary batteries respectively comprising the negative electrode active material of Comparative Examples 4 and 5 comprise a relatively large amount of silicon oxide particles compared with Comparative Examples 1 and 2, and thus had had lower output performance and poor lifespan properties when compared with the batteries of Comparative Examples 1 and 2.

Meanwhile, the secondary battery comprising the negative electrode active material of Comparative Example 3 in which a small amount of silicon-based particle was used had poor output performance, lifespan properties, and electrode adhesion force overall. This is because when the content of the silicon-based particle is reduced, the electrode capacity per area is also reduced, so that the thickness of an electrode should be increased in order to have the same capacity as the negative electrode active material of Example 1, thereby deteriorating the performance of the negative electrode.

Also, the output performance and the lifespan properties of the secondary battery comprising the negative electrode active material of Comparative Example 6 which contains natural graphite having a large specific surface area and the secondary battery comprising the negative electrode active material of Comparative Example 7 which contains artificial graphite having a large specific surface area were deteriorated when compared with the secondary battery comprising the negative electrode active material of Example 1. This is determined to be due to the increase in a side reaction of natural graphite or artificial graphite with the electrolyte in accordance with an increase in the specific surface area when compared with the negative active material of Example 1.

The invention claimed is:

1. A negative electrode active material for a lithium secondary battery, the negative electrode active material comprising:
   5 parts by weight to 20 parts by weight of a first carbon-based particle based on 100 parts by weight of a total negative electrode active material;
   73 parts by weight to 90 parts by weight of a second carbon-based particle based on 100 parts by weight of the total negative electrode active material; and
   3 parts by weight to 20 parts by weight of a silicon-based particle based on 100 parts by weight of the total negative electrode active material,
   wherein the first carbon-based particle is natural graphite, and the second carbon-based particle is artificial graphite,
   wherein the first carbon-based particle has an average particle diameter ($D_{50}$) of 8 μm to 16 μm,
   wherein the second carbon-based particle has an average particle diameter ($D_{50}$) of 15 μm to 25 μm,
   wherein the first carbon-based particle has a c-axis direction crystal size Lc(002) of 90 nm to 120 nm when measured by XRD, and
   wherein the second carbon-based particle has a c-axis direction crystal size Lc(002) of 60 nm to 90 nm when measured by XRD.

2. The negative electrode active material of claim 1, wherein the first carbon-based particle has an average particle diameter ($D_{50}$) of 11 μm to 16 μm.

3. The negative electrode active material of claim 1, wherein the second carbon-based particle has an average particle diameter ($D_{50}$) of 17 μm to 24 μm.

4. The negative electrode active material of claim 1, wherein a specific surface area of the first carbon-based particle is 1.5 $m^2/g$ to 4.5 $m^2/g$, and a specific surface area of the second carbon-based particle is 0.4 $m^2/g$ to 1.5 $m^2/g$.

5. The negative electrode active material of claim 1, wherein a specific surface area of the first carbon-based particle is greater than a specific surface area of the second carbon-based particle.

6. The negative electrode active material of claim 1, wherein the first carbon-based particle has a tap density of 0.9 g/cc to 1.2 g/cc.

7. The negative electrode active material of claim 1, wherein the second carbon-based particle has a tap density of 0.7 g/cc to 1.0 g/cc.

8. The negative electrode active material of claim 1, wherein the first carbon-based particle has a sphericity of 0.9 or more.

9. The negative electrode active material of claim 1, wherein the second carbon-based particle has a sphericity of 0.9 or less.

10. The negative electrode active material of claim 1, wherein a ratio of a total amount of the first carbon-based particle and the second carbon-based particle to an amount of the silicon-based particle is in a range of 60:40 to 99:1.

11. The negative electrode active material of claim 1, wherein the silicon-based particle is a mixture of one or more selected from the group consisting of Si, a silicon oxide particle, a Si-metal alloy, and a silicon-carbon complex, wherein the silicon oxide particle has a formula $SiO_x$, where $0<x\leq 2$.

12. The negative electrode active material of claim 1, wherein the silicon-based particle has an average particle diameter ($D_{50}$) of 1 μm to 30 μm.

13. A negative electrode for a lithium secondary battery comprising the negative electrode active material for a lithium secondary battery according to claim 1.

14. A lithium secondary battery comprising the negative electrode for a lithium secondary battery according to claim 13.

* * * * *